Patented Sept. 8, 1925.

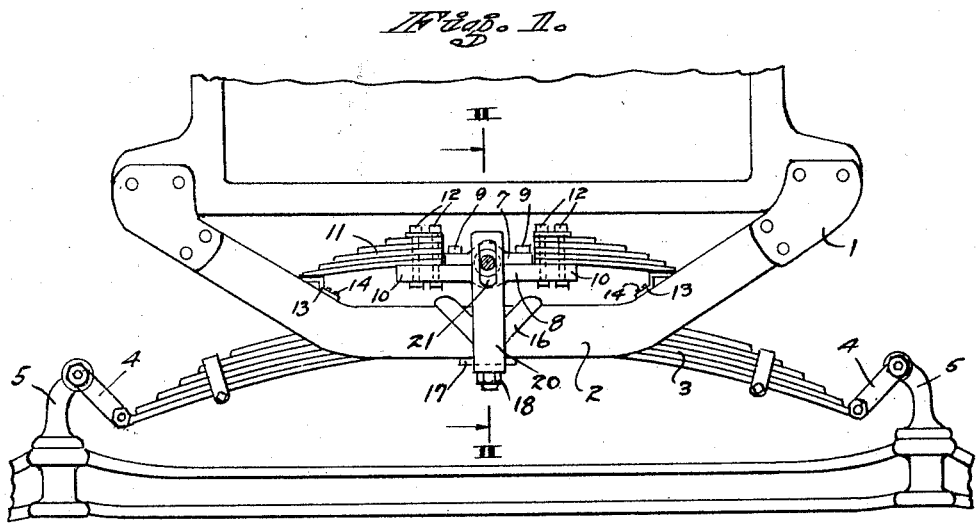
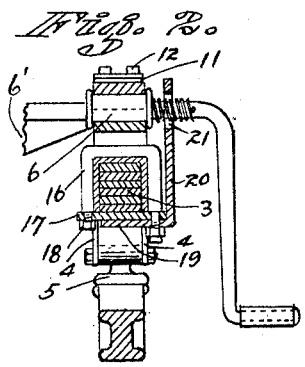
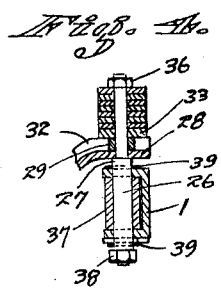
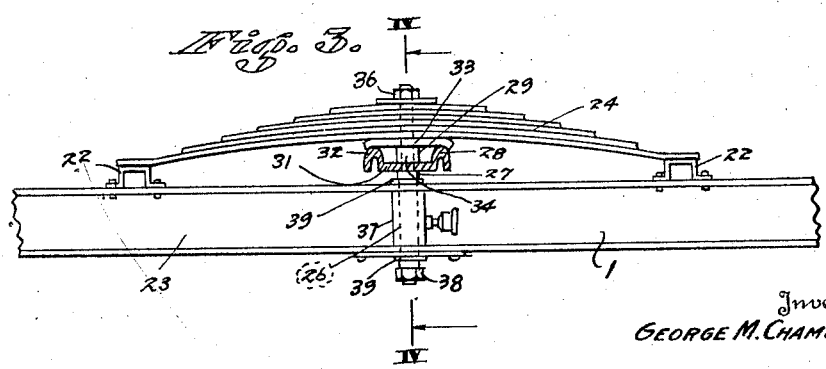

1,552,823

UNITED STATES PATENT OFFICE.

GEORGE M. CHAMBERS, OF HOLLISTER, CALIFORNIA.

SPRING SUSPENSION.

Application filed March 27, 1924. Serial No. 702,393.

*To all whom it may concern:*

Be it known that I, GEORGE M. CHAMBERS, a citizen of the United States, and a resident of Hollister, county of San Benito, State of California, have invented a new and useful Spring Suspension, of which the following is a specification.

The present invention relates to improvements in means for supporting a power plant of a motor vehicle on the frame thereof, and its principal object is to provide a yielding supporting means which will tend to dampen the vibrations of the engine. My vibration damper is particularly designed for the Ford automobile, the power plant of which is suspended at three points. While at the present time the power plant is more or less rigidly secured to the frame of the motor vehicle, it is the intention of the present invention to introduce spring means between the power plant and the frame for the purposes aforesaid.

The preferred form of my invention is illustrated in the accompanying drawing, in which Figure 1 shows a front view of the supporting arrangement for the power plant, Figure 2 a section taken along line 2—2 of Figure 1, Figure 3 a side view of the arrangement for supporting the sides of the power plant, and Figure 4 a cross section taken along line 4—4 of Figure 3. While I have shown only the preferred form of the invention it should be understood that various changes or modifications may be made within the scope of the claims herewith attached without departing from the spirit of the invention.

The frame (1) of the motor vehicle, which is substantially rectangular in form, presents a downwardly curved front member (2). This latter member is, in the motor vehicle in question, U shaped in cross section with the two flanges pointing downwardly and confining between the same the springs supported on the shackles (4) depending from the perches (5). The power plant of the Ford automobile the front end of which is shown at 6′ in Figure 2 has a forwardly extending projection terminating in a sleeve (6) which at the present time is rigidly secured to the front member (2) of the frame. In my improved arrangement this sleeve (6) of the power plant is clamped between two plates (7) and (8) by means of bolts (9), and one of the plates is provided with laterally extending arms (10), which are secured to the confronting ends (11) of two cantilever springs by means of bolts (12). The distant ends of the cantilever springs are supported on brackets (13) secured to the front member by means of screws (14).

The spring (3) which is received in the channel at the front member (2) is held therein by means of a clamp (16) surrounding the top and the sides of the front member and engaged at the bottom by a plate (17) which is tightened upon the same by nuts (18). Between one of the latter nuts and the plate (17) I introduce the flange (19) of a vertical plate (20) which latter is slotted as shown at (21) to receive the shaft of the crank handle and to allow the same to play vertically within certain limits.

Similar means for supporting the sides of the power plant are shown in Figures 3 and 4, from which it appears that the brackets (22) secured to the top faces of the lateral frame members (23) have the two ends of a spring (24) resting thereon. A vertical pin (26) extends through the center of the spring and through the two flanges of the frame and is formed with a shoulder (27) above the frame on which the bracket (28), extending laterally from the fly wheel housing is adapted to rest. The bracket is formed in the manner shown in Figure 3, with a flat central portion (31), and marginal ridges (32) and in order to firmly bind the bracket to the spring I introduce the plate (33) between the ridges and the spring and a spacing sleeve (34) between the plate (33) and the flat portion of the bracket, all the elements being confined between the shoulder (27) and a nut (36) adapted to be screwed on the top of the pin. The lower end of the pin which is of larger diameter than the upper end extends through registering perforations in the flanges of the frame and a bracing sleeve (37) surrounds the same between the flanges. A nut (38) at the bottom of the pin (26) limits the motion of the pin within the frame member and washers (39) of brake lining material are provided above and below the flanges of the frame member to deaden the shock in case the bracket (28) or the nut (38) should strike the frame.

The advantages of this construction will be readily understood from the foregoing description. As at present constructed the power plant has to partake of all vibrations transmitted to the frame of the vehicle through the main springs of the same. Where my resilient support is used for the power plant the vibrations of the frame are not transferred immediately to the power plant but are damped by the interposed springs.

I claim:

1. In a motor vehicle, a rigid frame having a front member, a power plant and means for yieldingly supporting the front end thereof comprising cantilever springs anchored to the front member and a holding element for the front end of the power plant supported by the confronting ends of the cantilever springs.

2. In a motor vehicle, a rigid frame having a front member arched downwardly, a power plant and means for yieldingly supporting the front end thereof comprising cantilever springs anchored to the front member and a holding element for the front end of the power plant supported by the confronting ends of the cantilever springs.

3. In a motor vehicle, a rigid frame having a front member, a power plant and means for yieldingly supporting the front end thereof comprising cantilever springs anchored to the front member, a holding element for the front end of the power plant supported by the confronting ends of the cantilever springs and a slotted plate secured to the front member allowing the front end of the power plant to play therein, while positively limiting its motion.

4. In a motor vehicle, supporting means for the front end of the power plant thereof comprising a downwardly curved frame member having brackets secured thereon in spaced relation, two cooperating cantilever springs seated with their distant ends on said brackets and a clamp supported on the confronting ends of the springs allowing the front end of the power plant to be held therein.

5. In a motor vehicle, a rigid frame having a front member, a power plant, spring means resting on the front member made to yieldingly support the front end of the power plant in the central portion thereof and a slotted plate secured to the front member allowing the front end of the power plant to play therein while positively limiting its motion.

GEORGE M. CHAMBERS.